US007550719B2

(12) United States Patent
Kawana

(10) Patent No.: US 7,550,719 B2
(45) Date of Patent: Jun. 23, 2009

(54) ELECTRON BEAM SOURCE DEVICE AVAILABLE FOR DETECTING LIFE SPAN OF FILAMENT

(75) Inventor: Shuichi Kawana, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 209 days.

(21) Appl. No.: 11/671,262

(22) Filed: Feb. 5, 2007

(65) Prior Publication Data

US 2008/0073556 A1 Mar. 27, 2008

(30) Foreign Application Priority Data

Feb. 24, 2006 (JP) ............................ 2006-049036

(51) Int. Cl.
*B01D 59/44* (2006.01)
*H01J 7/24* (2006.01)

(52) U.S. Cl. ....................... 250/283; 250/281; 250/489; 250/423 R; 250/423 F; 315/111.81; 315/111.91

(58) Field of Classification Search .............. 250/423 F, 250/427, 423 P, 426, 423 R, 489, 491.1, 492, 250/283, 282, 285, 281; 324/460, 459, 461–470; 313/7, 230, 293; 315/111.81, 111.71, 111.91, 315/111.31, 111.21
See application file for complete search history.

(56) References Cited

U.S. PATENT DOCUMENTS 6,492,640 B2 * 12/2002 Terakura ..................... 250/288
6,756,785 B2 * 6/2004 Peacock et al. ............. 324/460

FOREIGN PATENT DOCUMENTS

JP 11-86778 3/1999

* cited by examiner

*Primary Examiner*—Tuyet Vo
(74) *Attorney, Agent, or Firm*—J.C. Patents

(57) ABSTRACT

An electron beam source device is provided in which the disconnection and deterioration of a filament of the electron beam source device can be accurately predicted and determined, so as to avoid an unnecessary resource waste and increase of cost due to a premature replacement of a still-functional filament in a conventional device. Additionally, disorganization caused by a sudden disconnection or by the subsequent recovery procedure when the deformation of the filament occurs can be avoided to, reduce the measuring time, the maintenance and management man-hour. A filament current is measured at all time through a filament current measuring circuit 11, and a ratio of the filament current when the light-on time is zero to the current filament current is calculated at all time through an operational circuit 12.

12 Claims, 3 Drawing Sheets

| Lighting time [T] (hr) | Filament current [I] (Ampere) | △I/△T (Ampere ,x 10,000) |
|---|---|---|
| 0 | 3,104 | |
| 550 | 3,066 | 0.69 |
| 678 | 3,060 | 0.47 |
| 866 | 3,046 | 0.74 |
| 1,004 | 3,036 | 0.72 |
| 1,183 | 3,020 | 0.89 |
| 1,377 | 2,998 | 1.13 |
| 1,539 | 2,978 | 1.23 |
| 1,790 | 2,946 | 1.27 |
| 2,027 | 2,906 | 1.69 |
| 2,146 | 2,884 | 1.85 |

When emission current is 90 μA

| Lighting time (Any unit) | Filament current (Ampere) |
|---|---|
| 0 | 2.40 |
| 14 | 2.46 |
| 120 | 2.45 |
| 214 | 2.45 |
| 356 | 2.56 |
| 408 | 2.58 |
| 466 | 2.60 |
| 566 | 2.66 |
| 610 | 2.70 |
| 674 | – |

ELECTRON BEAM SOURCE DEVICE AVAILABLE FOR DETECTING LIFE SPAN OF FILAMENT

CROSS-REFERENCE TO RELATED APPLICATION

This application claims the priority benefit of Japan application serial no. 2006-049036, filed Feb. 24, 2006. All disclosure of the Japan application is incorporated herein by reference.

BACKGROUND OF THE INVENTION

1. Field of the Invention

The present invention relates to an electron beam source device with a filament for emitting hot electrons, such as an ion source for a mass spectrometer or a gas chromatography mass spectrometer in the analysis field, atom force field, vacuum field, and semiconductor field, etc.

2. Description of Related Art

In the following, an ion source used in a gas chromatography mass spectrometer (e.g., refer to Reference 1) is used as an example, and the construction and operation of a conventional electron beam source device are illustrated with reference to FIG. 4. FIG. 4 is a sectional view of the main construction of an ion source, and also illustrates the peripheral circuits relevant to the operation of the ion source. The ion source exhausts the air through a common vacuum exhaust device (not shown), so as to be operated in a vacuum environment. A filament F is heated by the electric power supplied by a filament power supply 1, so as to emit hot electrons. The emitted hot electron stream (hereinafter referred as an emission current) is accelerated to move towards an ionization chamber 2 upon being applied with an electron accelerating voltage of about 100 V by an electron acceleration power supply 3 disposed between the filament F and the box-shaped ionization chamber 2. The emission current is incident into the ionization chamber 2 from one of the openings disposed on the ionization chamber 2, and exits the ionization chamber 2 from another opening disposed on the opposite side of the above opening, so as to be collected in an electron collector 4. In order to effectively collect the emission current to the electron collector 4, in most cases, a magnetic field (not shown), for example, about several mT in magnitude, is applied in the traveling direction of the emission current in the ion source. If secondary electrons generated when the hot electrons crash the electron collector 4 flow into other electrodes such as the ionization chamber 2, etc., the external emission current will reduce the corresponding emitting volume of the secondary electrons; thus, an error occurs between the emission current and a standard emission current. However, as a voltage of several tens of volts is generally applied between the ionization chamber 2 and the electron collector 4 by a collector power supply 5, the generated secondary electrons are influenced by a repulsive force of the ionization chamber 2 that is at a ground potential, i.e., a relatively negative potential. The generated secondary electrons are again attracted by the electron collector 4, and the influence of the secondary electron is thereby obviated.

While being measured and displayed through an emission current meter 6, the value of the emission current collected by the electron collector 4 is further provided to an emission controller 7. An output of the emission controller 7 is fed back to the filament power supply 1, so as to increase/decrease the output of the filament power supply 1. In other words, when the emission current incident into the electron collector 4 is larger than a specified value, the emission controller 7 controls the output of the filament power supply 1 to reduce the electric power for heating the filament F. On the other hand, when the emission current incident into the electron collector 4 is less than the specified value, the emission controller 7 controls the output of the filament power supply 1 to increase the electric power for heating the filament F.

At one side of the ionization chamber 2, samples to be measured are introduced therein from a sample inlet opening 8. The samples to be measured are ionized in the ionization chamber 2 by the emission current, and they are guided out of the ionization chamber 2 from an ion outlet opening 9 in a direction at the back of the figure, so as to be incident into a mass selection portion (not shown) to perform the mass analysis. One portion of the filament F sublimates due to being heated; thus, the filament F needs to be replaced repeatedly. Generally, the period for replacing the filament F is determined according to an accumulated light-on time of the filament F used under an assumed standard emission current.

[Reference 1] JP Patent Laid Open H11-86778

The construction and operation of the conventional electron beam source device are described in abovementioned reference; however, with the construction electron beam source device described in the reference, as the period for replacing the filament merely determined by the accumulated light-on time, the filaments that still can be used may also be replaced. Thus, resources are wasted the replacement cost is increased. Accordingly, as mentioned above, the conventional replacement period is determined according to the accumulated light-on time of the filament used under the assumed standard emission current. However, under most cases, the emission current varies depending upon the different using conditions, and the accumulated light-on time is not exactly corresponding to the consumption of the filament; thus, the accuracy of the prediction is relatively low. For example, when being used under a smaller emission current, the filament that is still useful will be replaced and wasted. Thus, as described above, the resources are wasted, which is just the reason that causes the increase of the replacement cost. On the contrary, when being used under a large emission current, the filament will be disconnected in a shorter accumulated light-on time. Thus, the sudden disconnection interrupts the operations such as analysis, and disturbs the procedures.

Moreover, in the conventional construction, the quality difference among the filaments cannot be taken into consideration due to the problem in quality management. For example, even if a particular filament with a shorter life span than the standard filament is going to be broken, this situation cannot be predicted in the conventional device from the external. As a result, the necessary measures can be taken only after the disconnection occurs, thus causing an interruption of the operations such as analysis and causing the delay of the procedure. In addition, due to a similar quality management problem, for example, even if variation or instability of the analysis property occurs due to the deformation or short circuit of a particular filament in use, also similar to the above circumstance of disconnection, such a situation cannot be predicted beforehand from the external, so the property variation or instability is determined after the data is analyzed, and whether the filament has any problem or whether the filament is deformed or not can only be determined through the process of examining and repairing of the faulted device. The determination process requires certain duration of time. Therefore, the time spent on determining the problem with the time spent on repairing and reanalysis after the determination of the problem delays the procedure. The present invention is directed to providing a solution for such a problem.

SUMMARY OF THE INVENTION

As embodied and broadly described herein, the present invention is directed to providing an electron beam source device, which comprises a filament for generating an emission current composed of hot electrons and an electron collector for collecting the emission current, wherein the electron beam source device controls a filament current all the time to obtain a specified emission current. The electron beam source device comprises a mechanism for measuring a filament current at all times, and detecting and displaying the following circumstance, i.e., the ratio of the filament current for providing the specified emission current to the originally used filament current for providing the specified emission current is decreased to a predetermined threshold value or below the predetermined threshold value (Claim 1). In another aspect, the electron beam source device comprises a mechanism for measuring the filament current all the time, and detecting and displaying the following circumstance, i.e., the decrement per unit time of the filament current for providing the specified emission current, i.e., the decreasing speed of the filament current, exceeds a predetermined threshold value (Claim 2). In addition, the electron beam source device as claimed in Claim 1 or 2 comprises a mechanism for detecting and displaying the following circumstance, i.e., the ratio of the filament current for providing the specified emission current to the originally used filament current for providing the specified emission current is increased to the predetermined threshold value or above the predetermined threshold value (Claim 3). Furthermore, the electron beam source device as claimed in Claim 1 comprises a mechanism for calculating and then displaying the remaining life span of the filament according to the ratio of the filament current for providing the specified emission current to the originally used filament current for providing the specified emission current (Claim 4). Further, the electron beam source device as claimed in Claim 2 comprises a mechanism for calculating and then displaying the remaining life span of the filament according to the decrement per unit time of the filament current for providing the specified emission current, i.e., the decreasing speed of the filament current (Claim 5).

With the electron beam source device as claimed in Claim 1 or 2, the disconnection caused by the deterioration of the filament can be detected and displayed in advance. Moreover, with the electron beam source device as claimed in Claim 3, the abnormity caused by deformation and short circuit of the filament can be detected and displayed. Furthermore, with the electron beam source device as claimed in Claim 4 or 5, an operator can determine the remaining life span of the filament.

EFFECT OF THE PRESENT INVENTION

Compared with the replacement performed in the conventional art according to the mechanical light-on time, the time point for replacing the filament can be accurately determined through filament life span prediction based on objective data according to the present invention. Hence, any unnecessary replacement, and the waste of resources and the replacement cost are reduced. Moreover, as the pervious prediction for the disconnection of each filament corresponding to the quality difference of each filament can be achieved. Further, the analysis operation can be integrated into the procedure management in advance according to the prediction, so as to avoid the delay of the procedure caused by a sudden stop or an interruption of the analysis operation or caused by re-operation. In addition, the abnormity such as the deformation of the filament can be detected in real time, and thus replaced immediately after the abnormity occurs. Therefore, the time wasted on performing the subsequent operation for confirming the abnormity of the filament, as in the convention art, will be avoided, and the delay of the procedure can be reduced to a minimum level.

In order to achieve the aforementioned and other objects, features and advantages of the present invention comprehensible, preferred embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 2 are examples of the relationships between the light-on time and the filament current.

DESCRIPTION OF EMBODIMENTS

The electron beam source device provided by the present invention has the following characteristics. The first characteristic lies in that the electron beam source device includes a mechanism for measuring the filament current all the time, and detecting and displaying the following circumstance, i.e., the ratio of the filament current for providing the specified emission current to the originally used filament current for providing the specified emission current is decreased to a predetermined threshold value or below the predetermined threshold value. The second characteristic lies in that the electron beam source device includes a mechanism for measuring the filament current all the time, and detecting and displaying the following circumstance, i.e., the decrement per unit time of the filament current for providing the specified emission current, i.e., the decreasing speed of the filament current, exceeds a predetermined threshold value.

The third characteristic lies in that the electron beam source device as claimed in Claim 1 or 2 includes a mechanism for detecting and displaying the following circumstance, i.e., the ratio of the filament current for providing the specified emission current to the originally used filament current for providing the specified emission current is increased to the predetermined threshold value or above the predetermined threshold value. The fourth characteristic lies in that the electron beam source device as claimed in Claim 1 includes a mechanism for calculating and displaying the remaining life span of the filament according to the ratio of the filament current for providing the specified emission current to the originally used filament current for providing the specified emission current. The fifth characteristic lies in that the electron beam source device as claimed in Claim 2 includes a mechanism for calculating and displaying the remaining life span of the filament according to the decrement per unit time of the filament current for providing the specified emission current, i.e., the decreasing speed of the filament current. Therefore, the configurations having these characteristics are the most preferred configurations.

First Embodiment

Figures 1, 2A, 2B:
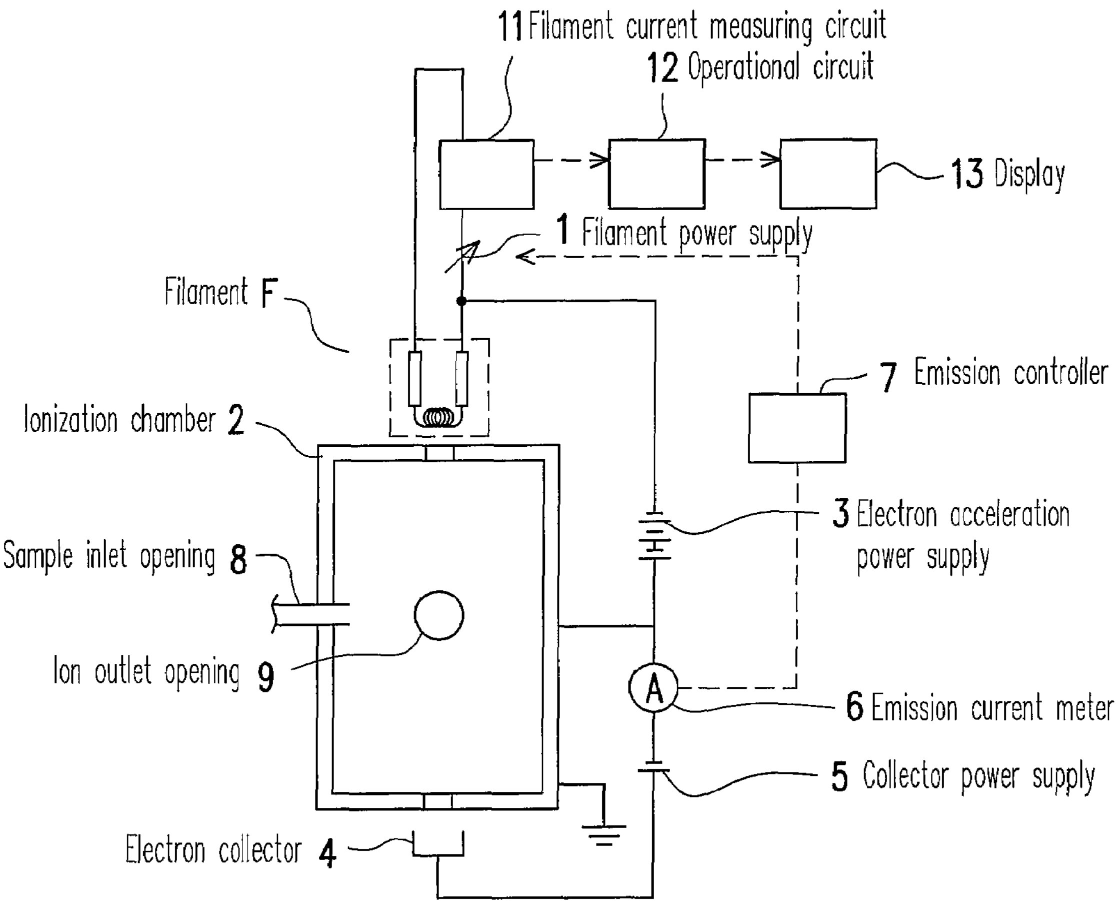
FIG. 1 is a view of a structure of a first embodiment of the present invention.
Figure 4:
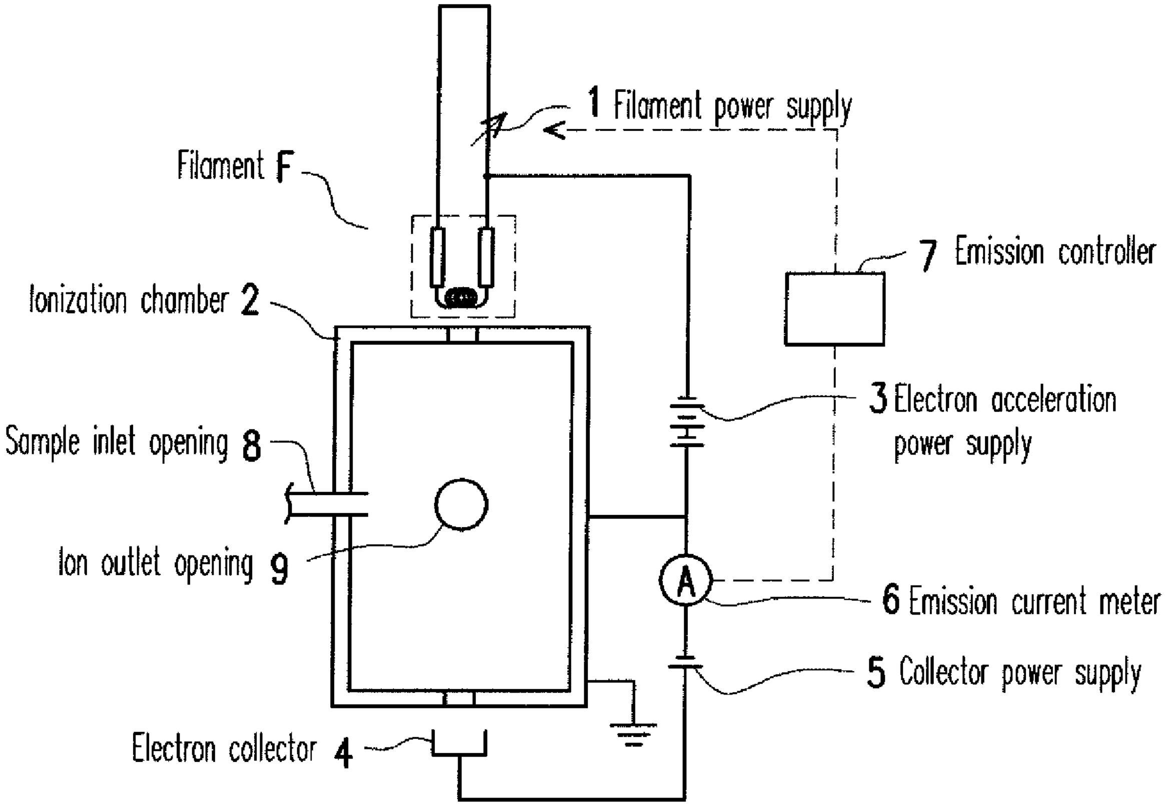
FIG. 4 (PRIOR ART)
FIG. 4 is a view of a structure of a conventional electron beam source device.

Hereinafter, the present invention is illustrated with reference to the accompanying figures. FIG. 1 is a sectional view of a first embodiment of the present invention. In FIG. 1, the parts marked with the same symbols as those in FIG. 4 have the same constructions and operations as those in FIG. 4. The emission current emitted from the filament F is incident into the ionization chamber 2 from one opening of the ionization chamber 2, and exited from the ionization chamber 2 through another opening disposed on the other side opposite to the above opening, so as to be collected in the electron collector 4. While being measured and displayed by the emission current meter 6, the value of the emission current collected by the electron collector 4 is further provided to the emission controller 7. The output of the emission controller 7 is fed back to the filament power supply 1, so as to maintain the emission current at a specified value.

The filament current is measured all the time by a filament current measuring circuit 11, and an initial filament current (i.e., the filament current when the light-on time is zero) and a current filament current are stored through an operational circuit 12 at every fixed time, for example, every 1 second. FIG. 2(A) shows an example (extracted and tabled) of the relationship between the light-on time (marked as "T" in the figure, with the time unit being hr) and the normal filament current (marked as "I" in the figure, with the current unit being Ampere) under the emission current of 90 μA. In addition, the values of ΔI/ΔT are summarized in the right column of the table in FIG. 2(A), which will be described in a second embodiment.

As seen from FIG. 2(A), under the circumstance of keeping the emission current as 90 μA, the filament current gradually decreases in a monotonic manner as the light-on time increases due to the consumption of the filament F. Therefore, a threshold reduction ratio (e.g., 0.94) of the filament current served as a using threshold to the initial filament current is determined in advance through experiments. The threshold reduction ratio and the transient ratio which is a ratio obtained at any time points are stored and calculated by the operational circuit 12. Then, the two ratios are compared with each other. Therefore, when the filament F reaches the using threshold, that is, the above ratios are less than the threshold reduction ratio, a signal indicating that the threshold reduction ratio is reached is generated by the operational circuit 12.

Additionally, as for the filament with standard property, the transient reduction ratio of the filament current for providing the specified emission current to the originally used filament current for providing the specified emission current, and a representative relationship between the reduction ratio and a remaining life span for the filament are measured and recorded in advance. Then, the practically measured transient current reduction ratio is compared with the current reduction ratio of the standard filament by the operational circuit 12. Further, according to the above representative relationship between the standard filament reduction ratio and the remaining life span, the remaining life span of the filament F at a certain current reduction ratio is considered as the remaining life span of the standard filament, and the appropriate information for the remaining life span can be displayed on the display 13. Furthermore, an alarm generating circuit (not shown) can be disposed in the operational circuit 12, so as to generate an alarm and send it to the operator.

When the emission current is increased, the consumption of the filament F also increases, and the signal indicating that the threshold reduction ratio has reached is automatically displayed in a shorter light-on time. When the emission current is reduced, the consumption of the filament F also decreases, such that the available light-on time is prolonged. Further, according to the present invention, the light-on time, which is the time point when the signal indicating that the threshold decreasing speed DC has reached is generated, is automatically prolonged. Thus, the unnecessary replacement of the filament F can be avoided.

FIG. 2(B) shows an example of irregular variation of the filament current caused by the deformation or internal short circuit of the filament F. In this example, the filament current increases along with the increasing of the light-on time, and the filament cannot be used at the light-on time of 674 (in any unit in the figure). Therefore, corresponding to the circumstance in FIG. 2(A), an upper limit ratio (e.g., 1.12) of the filament current is determined through a process similar to that used for determining the threshold reduction ratio described above. Once the filament current exceeds the upper limit ratio, a signal indicating that the upper limit is reached is generated by the operational circuit 12, and thus, the abnormity of the filament F can be displayed and the operator is notified. Furthermore, it is determined whether the filament current falls within a variation range with the threshold reduction ratio as the lower limit and with the upper limit ratio as the upper limit, and once exceeding the variation range, for example, once exceeding the upper limit, an information indicating the abnormity of the filament is generated, and once being lower than the lower limit, an information indicating that the filament life span is reached is generated. Therefore, the detection and display of both the threshold reduction ratio and the upper limit ratio can be combined together.

Second Embodiment

Figure 3:
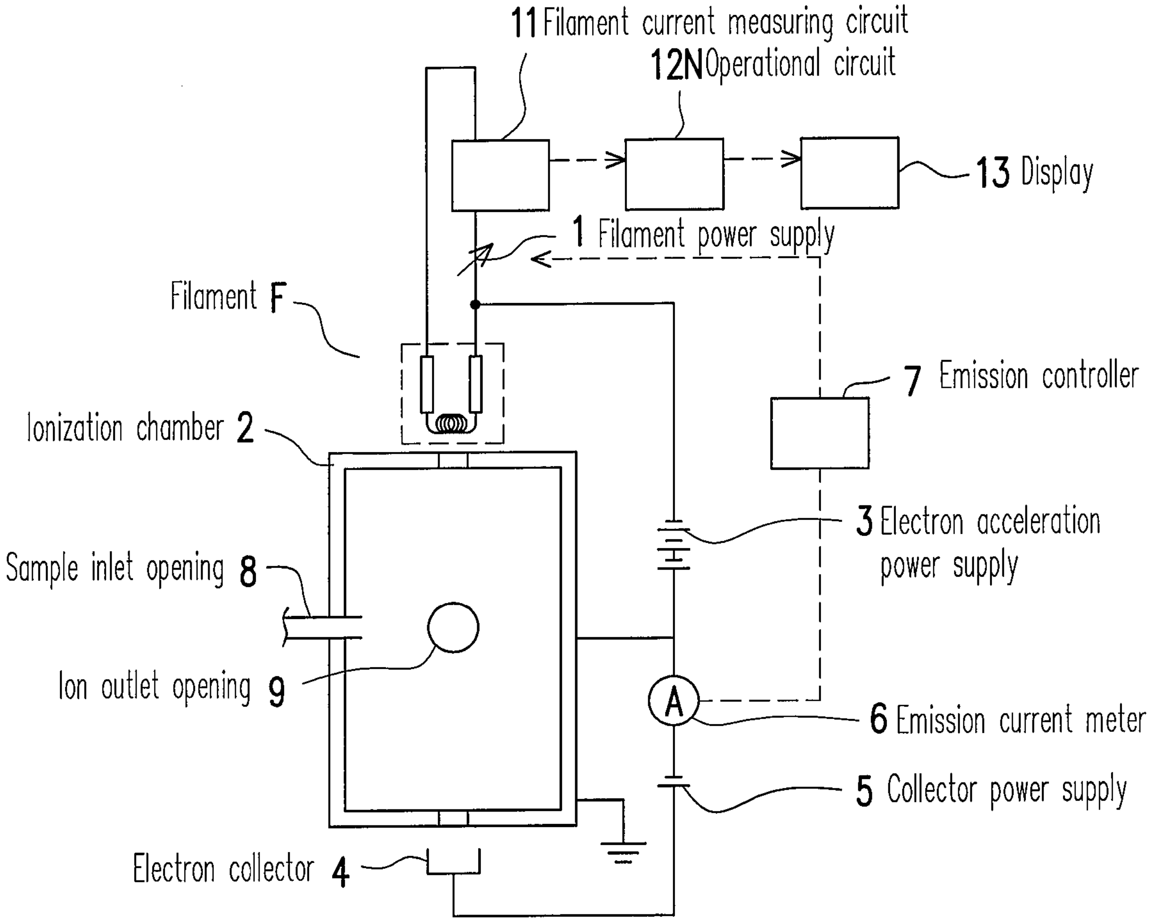
FIG. 3 is a view of a structure of a second embodiment of the present invention.

FIG. 3 is a sectional view of a second embodiment of the present invention. The parts in FIG. 3 marked with the same symbols as those in FIG. 1 have the same constructions or operations as those in FIG. 1, and thus the detailed description for the parts with the same symbols is omitted.

The filament current is measured all the time by the filament current measuring circuit 11, and the decrement of the filament current per unit time, i.e., the decreasing speed of the filament current, is calculated by an operational circuit 12N, and the necessary values are stored. FIG. 2(A) shows an example of the decreasing speed (ΔI/ΔT) of the filament current for a normal filament F. The values of ΔI/ΔT (absolute values, ×10,000) are shown in the right column of the table in FIG. 2(A). ΔT represents the value obtained by subtracting the light-on time (T in the figure) of the row immediately above the current row from the light-on time of the current row. Similarly, ΔI indicates the value obtained by subtracting the filament current (I in the figure) of the row immediately above the current row from the filament current of current row. The value of ΔI/ΔT of the current row is then calculated.

Taking the row with the light-on time of 678 (hr) as an example, the value of 128 (hr) obtained by subtracting the light-on time 550 (hr) of the row above from the light-on time 678 (hr) of the current row is determined as ΔT, and the value of −0.006 (A) obtained by subtracting the filament current 3.066 (A) of the row above from the filament current 3.06 (A)

of the current row is determined as ΔI. Thus, ΔI/ΔT is obtained to be −0.000047. In the table of FIG. 2(A), the absolute value of 0.47 obtained by multiplying the above value (decreasing speed) by 10,000 is shown. Hereinafter, the absolute value of the above value multiplied by 10,000 is determined as the decreasing speed D.

As seen from FIG. 2(A), the decreasing speed D gradually increases with the increasing of the light-on time due to the consumption of the filament F. Therefore, the threshold decreasing speed of the filament current served as the using threshold is determined through experiments (hereinafter, just like the above relationship between the above decreasing speed and the decreasing speed D, the absolute value of the threshold decreasing speed multiplied by 10,000 is determined as the threshold decreasing speed DC), the values of the decreasing speed D obtained at each time point is stored and calculated by the operational circuit 12N during practical measurement, and the decreasing speed D and the threshold decreasing speed DC (e.g., 1.8) are compared all the time in the operational circuit 12N. Therefore, the time point when the decreasing speed D exceeds the threshold decreasing speed DC is determined as the use limit for the filament F. Thus, a signal indicating that the threshold decreasing speed DC has reached is generated by the operational circuit 12N at that time point, and the appropriate information is displayed on the display 13.

Moreover, through the operational circuit 12N, the gradient of the actually measured decreasing speed D is compared with the gradient of the decreasing speed D for the standard filament determined in advance through experiments. The representative relationship between the value of the decreasing speed D for the standard filament obtained in advance and the remaining life span of the standard filament is considered as the actually measured remaining life span of the filament F, and the appropriate information is displayed on the display 13.

Furthermore, an alarm generating circuit (not shown) can also be disposed in the operational circuit 12N, so as to generate an alarm and send the alarm to the operator. When the emission current is increased, the consumption of the filament F is increased and the signal indicating that the threshold decreasing speed DC is reached is automatically displayed in a shorter light-on time. When the emission current is decreased, the consumption of the filament F is also decreased, and the available light-on time is prolonged. According to the present invention, the light-on time, which is the time point when the signal indicating that the threshold decreasing speed DC has reached is generated, is automatically prolonged. Thus, any unnecessary replacement of the filament F is obviated. As for the irregular variation of the filament current caused by deformation or internal short circuit of the filament F, the mechanism same as that of the first embodiment may be used. In essence, the upper limit ratio (e.g., 1.12) of the filament current is determined. Once the filament current exceeds the upper limit ratio, the signal indicating that the upper limit has reached is generated by the operational circuit 12N; thus, information indicating any abnormity of the filament F can be displayed and send to the operator.

Furthermore, whether the above decreasing speed D falls within the variation range between the initial value and the threshold decreasing speed DC and whether the ratio of the filament current to the initial value at the beginning of usage falls within the variation range between 1 and the upper limit ratio are determined. Once the decreasing speed D and the ratio of the filament current to the initial value exceed their respective variation ranges, for example, when the upper limit ratio is exceeded, the information indicating the abnormity of the filament is generated, and the threshold decreasing speed DC is exceeded, the information indicating that the filament life span has reached is generated. In the above manner, the detection and display of information regarding both the life span and the abnormity of the filament can be collectively achieved.

The present invention is not limited to above embodiments; rather the present invention covers various alternative embodiments provide they fall within the principle of this invention. For example, a personal computer or a part of personal computer can be used in the operational circuit 12, the operational circuit 12N, and the display 13, etc. In the embodiments, the display of the remaining life span of the filament also can be the display of the replacement time of the filament. Moreover, besides the characters, the information being displayed also can be displayed with color difference, such as color bar, etc., added to the characters.

In addition, the filament is automatically extinguished when the life span is reached or abnormity occurs. In the electron beam source device with two or more filaments disposed therein, the filaments can be switched automatically. Furthermore, in the above embodiments, the construction of the present invention is illustrated through the ion source used in a gas chromatography mass spectrometer; however, the present invention is not only applicable to the gas chromatography mass spectrometer. The present invention is also applicable to ion source or electron source devices that employ filaments. The present invention is applicable to all types of ion source or electron source devices.

Availability in Industry

The present invention is applicable to an electron beam source device using a filament for emitting hot electrons, such as an ion source of a mass spectrometer or a gas chromatography mass spectrometer in the analysis field, atom force field, vacuum field, and semiconductor field, etc.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An electron beam source device, comprising a filament for generating an emission current composed of hot electrons and an electron collector for collecting the emission current, wherein the electron beam source device controls a filament current at all time to obtain a specified emission current, wherein the electron beam source device comprises a mechanism for measuring the filament current at all time, and detecting and displaying that a ratio of the filament current for providing the specified emission current to an originally used filament current for providing the specified emission current is reduced to a predetermined threshold value or below the predetermined threshold value.

2. The electron beam source device as claimed in claim 1, wherein a disconnection caused by a deterioration of the filament is detected and displayed in advance.

3. The electron beam source device as claimed in Claim 1, comprising a mechanism for detecting and displaying the ratio of the filament current for providing the specified emission current to the originally used filament current for providing the specified emission current is increased to the predetermined threshold value or above the predetermined threshold value.

4. The electron beam source device as claimed in claim 3, wherein an abnormity caused by deformation and short circuit of the filament is detected and displayed.

5. An electron beam source device, comprising a filament for generating an emission current composed of hot electrons and an electron collector for collecting the emission current, wherein the electron beam source device controls a filament current at all time to obtain a specified emission current, wherein the electron beam source device comprises a mechanism for measuring the filament current at all time, and detecting and displaying that a decrement per unit time of the filament current for providing the specified emission current exceeds a predetermined threshold value.

6. The electron beam source device as claimed in claim 5, wherein a disconnection caused by a deterioration of the filament is detected and displayed in advance.

7. The electron beam source device as claimed in claim 5, comprising a mechanism for detecting and displaying the ratio of the filament current for providing the specified emission current to the originally used filament current for providing the specified emission current is increased to the predetermined threshold value or above the predetermined threshold value.

8. The electron beam source device as claimed in claim 7, wherein an abnormity caused by deformation and short circuit of the filament is detected and displayed.

9. An electron beam source device, comprising a filament for generating an emission current composed of hot electrons and an electron collector for collecting the emission current, wherein the electron beam source device controls a filament current all the time to obtain a specified emission current, and measuring and recording in advance a reduction ratio of the filament current for providing the specified emission current to the originally used filament current for providing the specified emission current, and a representative relationship between the reduction ratio and a remaining life span of the filament, wherein the electron beam source device comprises a mechanism for measuring the reduction ratio of the filament current for providing the specified emission current of the filament in use to the originally used filament current for providing the specified emission current, and then, according to the representative relationship between the reduction ratio and the remaining life span of the filament with standard property, predicting and calculating the remaining life span of the filament in use.

10. The electron beam source device as claimed in claim 9, wherein an operator is notified of the remaining life span of the filament.

11. An electron beam source device, comprising a filament for generating an emission current composed of hot electrons and an electron collector for collecting the emission current, controlling a filament current all the time to obtain a specified emission current, and measuring and recording in advance a transient decrement, obtained at any time point, per unit time of the filament current for providing the specified emission current, and a representative relationship between the decrement and a remaining life span for the filament with standard property, wherein the electron beam source device comprises a mechanism for measuring the decrement per unit time of the filament current of the filament in use for providing the specified emission current, and according to the representative relationship relevant to the filament with standard property, predicting, calculating and displaying the remaining life span of the filament in use.

12. The electron beam source device as claimed in claim 11, wherein an operator is notified of the remaining life span of the filament.

* * * * *